(12) United States Patent
Böckenhoff

(10) Patent No.: US 11,611,249 B2
(45) Date of Patent: Mar. 21, 2023

(54) ELECTRIC MACHINE AND MOTOR VEHICLE

(71) Applicant: AUDI AG, Ingolstadt (DE)

(72) Inventor: Paul Böckenhoff, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 39 days.

(21) Appl. No.: 17/328,039

(22) Filed: May 24, 2021

(65) Prior Publication Data

US 2022/0029480 A1    Jan. 27, 2022

(30) Foreign Application Priority Data

Jul. 27, 2020    (DE) .......................... 102020119679.2

(51) Int. Cl.
*H02K 1/24*    (2006.01)
*H02K 1/02*    (2006.01)
(Continued)

(52) U.S. Cl.
CPC ................. *H02K 1/24* (2013.01); *H02K 1/02* (2013.01); *H02K 1/28* (2013.01); *H02K 3/28* (2013.01);
(Continued)

(58) Field of Classification Search
CPC .............. H02K 1/02; H02K 1/24; H02K 1/28; H02K 3/28; H02K 3/325; H02K 3/345; H02K 3/527; H02K 5/16
(Continued)

(56) References Cited

U.S. PATENT DOCUMENTS

| | | | | |
|---|---|---|---|---|
| 5,140,204 A | * | 8/1992 | Cashmore | H02K 9/225 310/214 |
| 6,225,723 B1 | * | 5/2001 | Cooper | H02K 1/24 310/214 |
| 6,933,648 B2 | | 8/2005 | Buchan et al. | |
| 7,015,616 B2 | * | 3/2006 | Doherty | H02K 3/527 310/194 |

(Continued)

FOREIGN PATENT DOCUMENTS

CN    103532269 A    1/2014
CN    210724370 U    6/2020
(Continued)

OTHER PUBLICATIONS

German Examination Report dated Jun. 7, 2021, in connection with corresponding DE Application No. 10 2020 119 679.2 (9 pp., including machine-generated English translation).

*Primary Examiner* — Rashad H Johnson
(74) *Attorney, Agent, or Firm* — Maier & Maier, PLLC

(57) ABSTRACT

An electric machine comprising a rotor having a rotor body. The rotor body has multiple poles each carrying at least one rotor winding formed from multiple conductor loops. The poles extend in a radial direction of the rotor and the conductor loops pass through slots each formed between two adjacent poles. A support element extending in the radial direction is arranged in each of the slots between the rotor windings of the adjacent poles. The support element applies pressure to the conductor loops when the rotor rotates and/or heats up. A pressure distribution element extending at least in portions in the radial direction along the support element and the adjacent rotor winding is arranged between the support element and the rotor windings, which pressure distribution element distributes the pressure applied by the support element onto the adjacent rotor winding.

20 Claims, 2 Drawing Sheets

(51) Int. Cl.
    *H02K 3/28*         (2006.01)
    *H02K 3/34*         (2006.01)
    *H02K 5/16*         (2006.01)
    *H02K 3/52*         (2006.01)
    *H02K 1/28*         (2006.01)
    *H02K 3/32*         (2006.01)

(52) U.S. Cl.
    CPC ............. *H02K 3/325* (2013.01); *H02K 3/345* (2013.01); *H02K 3/527* (2013.01); *H02K 5/16* (2013.01)

(58) Field of Classification Search
    USPC .................................. 310/214, 216.082, 269
    See application file for complete search history.

(56) References Cited

U.S. PATENT DOCUMENTS

| | | |
|---|---|---|
| 9,601,961 B2 | 3/2017 | Lee et al. |
| 10,063,116 B2 * | 8/2018 | Himmelmann ........ H02K 3/527 |
| 2016/0072352 A1 * | 3/2016 | Lee ........................ H02K 3/487 |
| | | 310/214 |
| 2016/0211716 A1 * | 7/2016 | Patel ...................... H02K 3/527 |

FOREIGN PATENT DOCUMENTS

| | | |
|---|---|---|
| DE | 433070 C | 8/1926 |
| DE | 60117084 T2 | 7/2006 |
| DE | 102012105319 A1 | 12/2012 |
| GB | 722470 A | 1/1955 |
| WO | 2014/024023 A2 | 2/2014 |

\* cited by examiner

ELECTRIC MACHINE AND MOTOR VEHICLE

FIELD

The invention relates to an electric machine comprising a rotor with a rotor body, wherein the rotor body has multiple poles each carrying at least one rotor winding formed from multiple conductor loops, wherein the poles extend in a radial direction of the rotor and the conductor loops pass through slots formed between two adjacent poles, wherein a support element extending in the radial direction is arranged in each of the slots between the rotor windings of the adjacent poles. The invention furthermore relates to a motor vehicle.

BACKGROUND

In electric machines with separately excited rotors, for example in separately excited synchronous machines, the rotor field of the electric machine is generated by means of rotor windings arranged on the rotor of the electric machine, through which a current flows. As the rotor rotates when the electric machine is in operation, the rotor windings must be mechanically fastened against a centrifugal force which occurs when the electric machine is in operation. The rotor windings can be fastened in this way, for example, by completely encapsulating the rotor windings with their receptacles on the rotor, such that the encapsulation can serve as a support body for the rotor windings. In this case, however, internal stresses can arise due to the hardening of the encapsulation, which can lead to adhesion failure during operation of the electric machine, for example to delamination of the encapsulating compound from the rotor, and/or lead to cohesion failure, that is to say to the formation of cracks in the encapsulating compound. As such errors usually occur asymmetrically, a rotor imbalance can arise as a result, which has undesirable consequences such as damage to a bearing or noise emissions when the electric machine is in operation.

Another known possibility of fixing rotor windings in place on the rotor is the use of support plates which, for example, are placed against the windings between two adjacent poles and are fixed in place on the rotor. Therein, the use of support plates can have the disadvantage that they can expand radially under the influence of centrifugal force, such that the windings become detached from the stator in some areas. This can result in an undesirable air gap between the windings and the stator, which can have a disadvantageous effect on heat dissipation from the rotor windings. A reduction in the cooling of the rotor windings can in particular have a negative effect on the continuous output of the rotor or the electric machine. Because of the wall thickness required for sufficient stability, support plates of this type can also be heavy, which can also have a negative effect on the performance of the electric machine.

A rotor for an electric machine is known from WO 2014/024 023 A2, wherein T-shaped holding elements are arranged between the rotor coils of the rotor to fix the rotor coils in place when an electric machine comprising the rotor is in operation.

GB 722 470 A describes an electric machine in which a clamp is fastened to the rotor by means of screws to support rotor windings. The rotor windings are pressed against poles of the rotor by side surfaces of the clamp.

CN 103532269 A describes a rotor structure for a rotor of a generator rotating at high rotational speed, wherein V-shaped wedges are used between two adjacent rotor windings for fixing the rotor windings.

The problem underlying the invention is to specify an electric machine which enables the conductor loops of the rotor winding to be fixed in place as stably as possible.

SUMMARY

To solve this problem, the invention provides an electric machine of the type mentioned above, in which the support element applies pressure to the conductor loops when the rotor rotates and/or heats up, wherein a pressure distribution element extending at least in portions in the radial direction along the support element and the adjacent rotor winding is arranged between the support element and the rotor windings, which pressure distribution element distributes the pressure applied by the support element onto the adjacent rotor winding.

The rotor body comprises multiple poles, wherein a slot is designed between each two adjacent poles, in which slot are arranged the conductor loops of the respective rotor windings arranged on the adjacent poles. A support element is arranged in a slot between the rotor windings of two adjacent poles, that is to say between the conductor loops of the rotor windings arranged on adjacent poles, which support element extends in a radial direction through the slot. Due to the expansion of the support element when the rotor rotates and/or heats up, the support elements press the respective rotor windings against the poles and/or into the slots that carry the rotor windings. This makes possible a stable fixation of the rotor windings on the rotor. Furthermore, pressing the rotor windings against the poles and/or into the slots of the rotor body has the advantage that no air gaps arise between the rotor windings and the rotor body under the influence of centrifugal forces when the electric machine is in operation, i.e., when the rotor is rotating. This improves the heat dissipation from the rotor windings into the rotor body, as the respective heat-conducting paths are not interrupted by air gaps. In this way, an improved cooling of the rotor can be achieved even at high rotational speeds and high temperatures.

The pressure distribution element, which is arranged between the rotor windings and the support element, makes for a more uniform pressure distribution of the pressure on the conductor loops of the rotor windings, which is generated by the support element as it rotates and/or heats up. This can advantageously prevent the rotor windings from deforming unevenly under the influence of the centrifugal force, in particular prevent a bulging of the rotor winding in a radially outer portion of the rotor windings due to insufficient pressure of the support element applied at that location.

A non-uniform deformation of the rotor windings under high temperatures and centrifugal force loads can be avoided by means of the pressure distribution element, such that, in particular, material stress in the rotor windings can be reduced. The pressure distribution element thus helps to ensure the winding strength at particularly high temperatures and rotational speeds, and to prevent the occurrence of deformation-related stresses and/or damages, for example to a compound matrix encapsulating the conductor loops of one of the rotor windings. As a result, the electric motor can advantageously be operated at higher performance under these environmental conditions.

The pressure distribution element is at least essentially dimensionally stable, particularly when the rotor rotates and/or heats up, such that the pressure distribution element and thus also the rotor windings can be guaranteed to be dimensionally stable due to the arrangement of the pressure distribution element between the support body and the rotor windings, due to the pressure generated by the support element, even under high centrifugal forces. The pressure distribution element can in particular be designed of a rigid and/or hard material, such that it is not, or at least not essentially, deformed during the operation of the electric machine.

The pressure distribution element can in particular make it possible to avoid deformations in an outermost wire layer or an outermost winding of the rotor winding, which lead to a bulging of the rotor winding. Under the influence of a centrifugal force, the windings of the rotor winding can shear off against each other, which contributes to increased material stresses in the rotor winding and has a negative effect on the winding strength. By arranging the pressure distribution element between the rotor winding and the support element, such effects can advantageously be counteracted, due to the improved distribution of the pressure generated by the support element on the rotor winding and thus a uniform pressing of the rotor winding.

The shape of the pressure distribution element can correspond, in particular, to an outer contour of the rotor windings in the region in which the pressure distribution element is in contact with the rotor windings, and to an outer contour of the support element in the region in which the pressure distribution element is in contact with the support element, such that a gap-free arrangement of the pressure distribution element between one of the rotor windings and the support element is possible.

Fastening the rotor windings to the rotor by means of the support element and the pressure distribution element advantageously makes it possible to use the electric machine for drives with high rotational speeds, for example for driving a motor vehicle. In such machines, rotational speeds of up to 17,000 revolutions per minute can occur, for example, and temperatures of up to 180° C. can be reached, wherein in particular the support element and the pressure distribution element have the effect of tightly fixing the conductor loops in place, resulting in a fit of the conductor loops, or the rotor windings, on the rotor without clearance. This facilitates the heat dissipation from the rotor windings, as no air gaps occur between the rotor windings and the rotor body, which would interrupt a heat-conducting path, such that the continuous output capability of the electric machine can be increased.

Compared to a complete encapsulating of the rotor windings in the slots, this has the advantage that the cost of a encapsulating compound material, for example an epoxy resin, can be saved and that no costly and time-consuming encapsulating method such as vacuum-based encapsulation or pressure gelation has to be used. The devices and process steps used for this purpose, in particular the time-consuming curing of the compound material, can advantageously be dispensed with. In contrast to a complete encapsulation of the windings in the slots, the use of the support element and the pressure distribution element makes it possible to permit the delamination of rotor windings formed, for example, by respective encapsulated conductor tracks, as it is still possible to stably fix the rotor windings in place in the slots. By permitting delaminations in the encapsulated rotor windings, internal stresses, which can occur during curing in respective encapsulated rotor windings, can be reduced.

By using the support element and the pressure distribution element, the tolerance requirements for the rotor windings, in particular for their winding quality, can be lower than when using solid support plates for fastening the rotor windings. Furthermore, the requirements for a material of the support body can be reduced due to the additionally used pressure distribution element, which enables, for example, the use of standard materials for the support element.

According to the invention, the pressure distribution element may extend across the entire radial length of the rotor windings or the pressure distribution element may extend over a part, in particular over a radially outer part, of the radial length of the rotor winding and may be accommodated in a corresponding slot of the support element and/or the rotor winding.

Therein, the pressure distribution element can extend in particular in a radially outer portion of the rotor winding between the rotor winding and the support element, such that deformations which may occur in that location in particular can be avoided. The pressure distribution element can be arranged in a slot in the support element or in a slot in the rotor winding, in particular flush with the surface of the support element or of the rotor winding.

The arrangement of the pressure distribution element across the entire radial length of the rotor winding or the arrangement of a pressure distribution element extending only across part of the radial length of the rotor winding in a slot of the support element and/or in a slot of the rotor winding in particular enables an at least essentially gap-free arrangement of the pressure distribution element between the rotor winding and the support element or an at least essentially gap-free arrangement of the rotor windings and the support element. This has the advantage that, when the rotor rotates and/or heats up, the pressure from the support element can act directly from the support element onto the rotor winding or from the support element via the pressure distribution element onto the rotor winding. Furthermore, an arrangement of the components in the slot that is as gap-free as possible contributes to improved heat dissipation from the rotor windings. The pressure distribution element can extend in the axial direction of the rotor, in particular across the entire length of the slot or across the entire length of the rotor winding and/or of the support element.

In a preferred embodiment of the invention, the pressure distribution element may consist at least partially of a metal, in particular an austenitic steel, or of a ceramic. A pressure distribution element made of a metal or a steel, in particular an austenitic steel, or a pressure distribution element made of a ceramic results in sufficient strength and dimensional stability of the pressure distribution element and thus good pressure distribution and high winding strength of the rotor windings.

According to the invention, the support element may have a first, radially inner portion and a second, radially outer portion, wherein the support element has two side surfaces extending parallel in the radial direction in the first portion and two side surfaces in the second portion which at least partially diverge in the radial direction. In the first portion, the support element has an essentially I-shaped cross section through the side surfaces extending parallel in the radial direction, as seen in relation to a surface in the radial direction and circumferential direction of the rotor. In the second portion, the support element can correspondingly have a trapezoidal cross section, wherein the width of the cross section increases in a radially outward direction. This widening of the support element in a radially outer portion also ensures that, in addition to a laterally acting force component, an at least partially radially inwardly directed force component is generated as well, which acts on the conductor loops, such that, due to an expansion of the support element, the rotor winding is pushed into the slot or against the pole carrying the rotor winding. This has the advantageous effect that no air gap arises between the rotor winding and the rotor body even at a bottom of the slot, particularly when they rotate and/or heat up.

According to the invention, the pressure distribution element may extend at least across a transition area between the first portion and the second portion of the support element between the adjacent rotor winding and the support element. Therein, the pressure distribution element can in particular extend across the transition area between the first portion and the second portion at least essentially up to a radially outer end of the second portion, such that a deformation of the rotor windings under the influence of a centrifugal force can be advantageously avoided, particularly in a radially outer region of the rotor winding.

In a preferred embodiment of the invention, the second portion may expand to a greater extent than the first portion as it rotates and/or heats up. For this purpose, for example, the second portion can consist of a material or comprise a material which differs from a material of the first portion in that it has a lower strength and/or a higher coefficient of thermal expansion. Due to the greater expansion of the second portion as it rotates and/or heats up, a pressure generated by the second portion of the support element can be increased during operation of the electric machine, such that an improvement in the winding strength can be achieved in particular in a radially outer region of the rotor winding which is opposite the second portion of the support element.

In a preferred embodiment of the invention, the first portion and the second portion can each be made of a plastic, in particular a thermosetting plastic and/or a thermoplastic. It is possible that further substances and/or materials, for example carbon fibers or glass fibers, are introduced into the plastic in the first portion and/or in the second portion to change its mechanical and/or thermal properties. The material used for the first portion and for the second portion can differ, in particular, by permitting different expansions as it rotates and/or heats up. For example, the material of the first portion can have a higher strength and/or a lower coefficient of thermal expansion than the material of the second portion, such that the second portion can expand to a greater extent as it rotates and/or heats up.

According to the invention, the support element may be in contact with the rotor body at the radially inner end of the slot. Therein, the support element can, for example, be in direct contact with a radially inner base of the slot which delimits the slot towards the inside, such that the support element is supported on the rotor body inwards relative to the radial direction.

In a preferred embodiment of the invention, the support element may at a radially outer end of the slot be in contact with a counter bearing element arranged radially between the adjacent poles in a fixed manner. The counter bearing element enables the support element to be supported radially in a direction pointing radially outward from the slot. This simplifies the formation of a pressure component acting laterally on the rotor windings adjoining the support element when the rotor rotates and/or heats up. The counter bearing element can be a wedge, for example. A counter bearing element designed as a wedge also serves to close a radially outer end of the slot, in particular across the entire axial length of the slot.

Supporting the support element on the counter bearing element in particular prevents, or essentially prevents, a widening of the support element in the radial direction. This makes it possible for the support element to widen at least in regions in the circumferential direction as it rotates when the electric machine is in operation and/or if it heats up during operation of the electric machine, thereby pressing the conductor loops against the rotor body.

The counter bearing element may consist at least partially of a metal, in particular an austenitic steel, or of a ceramic. The counter bearing element can be a stamped sheet metal part, for example. The formation of the counter bearing element from metal, in particular from an austenitic steel, or from ceramic has the advantage that a high mechanical strength of the counter bearing element can be achieved, such that no or essentially no deformations of the counter bearing element occur in the axial direction when the rotor rotates.

According to the invention, the counter bearing element may be fastened to two adjacent poles, wherein a portion of the counter bearing element extending between the poles and traversing the slot is in contact, in particular in its entirety, with the support element. Therein, the counter bearing element is fixed in position at least with regard to radial movements and movements in the circumferential direction, such that it does not move when the rotor of the electric machine rotates, but rather remains in a fixed position. An as large as possible contact surface of the support element on the counter bearing element, that is, a particularly full contact of the support element against the portion of the counter bearing element traversing the slot, enables a thermal and/or centrifugal force-related widening of the support element in the circumferential direction in particular at the radially outer end of the support element, that is, at the end of the support element which is in contact with the counter bearing element.

In a preferred embodiment of the invention, opposite poles each can have a fastening slot, wherein the counter bearing element is fastened to the poles by engaging with the edges of the fastening slots. The counter bearing element can, for example, be designed in the shape of a panel, such that two opposite edges of the panel can engage with the fastening slots formed on opposite poles and spaced apart in the circumferential direction. This enables the counter bearing element to be fixed both in the radial direction and in the circumferential direction. The formation of the fastening slots on the poles can be used, for example, to insert the counter bearing element in the axial direction between the opposite poles when the electric machine is being installed. It is also possible to fasten the counter bearing element in the axial direction.

According to the invention, the support element and the counter bearing element may engage with one another via a positive-locking connection comprising at least one tongue-and-groove connection. Therein, the counter bearing element and/or the support element may have at least one fastening slot, wherein the respective other parts have a corresponding spring which engages with the fastening slot. This enables the support element to be fastened to the counter bearing element in a positive-locking manner, in particular in the circumferential direction.

In a preferred embodiment of the invention, a slot insulation, in particular an insulating paper and/or an insulating coating, may be arranged on an inner wall of the slots and/or on the support element. This slot insulation contributes, for example, to insulating the rotor windings relative to the rotor body, which is at ground potential, for example. It is possible that a slot insulation is also provided between the support element, the pressure distribution element and/or the rotor windings, in which case particularly the slot insulation and the rotor windings are in direct contact with one another.

According to the invention, the rotor body may be formed from a laminated core comprising multiple lamination sheets and the support element may have at least one passage extending in the axial direction, wherein a tie rod is arranged in the passage for fastening the laminations to one another. The lamination sheets forming the rotor body can in particular be lined up axially. By providing at least one axial passage, a tie rod can be received in the support element, which tie rod can be used for fastening or for bracing the lamination sheets of the rotor body in the axial direction. In particular, the tie rod may completely fill the passage formed in the support element to avoid deformation of the support element into the cavity of the passage.

A motor vehicle according to the invention is intended to comprise an electric machine according to the invention. Therein, the electric machine can in particular be a traction electric motor of the motor vehicle, which can be used to drive the motor vehicle. The electric machine can in particular be a drive with high rotational speeds, which can reach rotational speeds of up to 17,000 revolutions per minute. It is possible for the motor vehicle to comprise multiple of these electric machines, for example as traction electric motors associated with individual axles and/or individual wheels.

BRIEF DESCRIPTION OF THE FIGURES

Further advantages and details of the invention follow from the exemplary embodiments described below and from the drawings. These are schematic representations and show.

DETAILED DESCRIPTION

Figure 1:
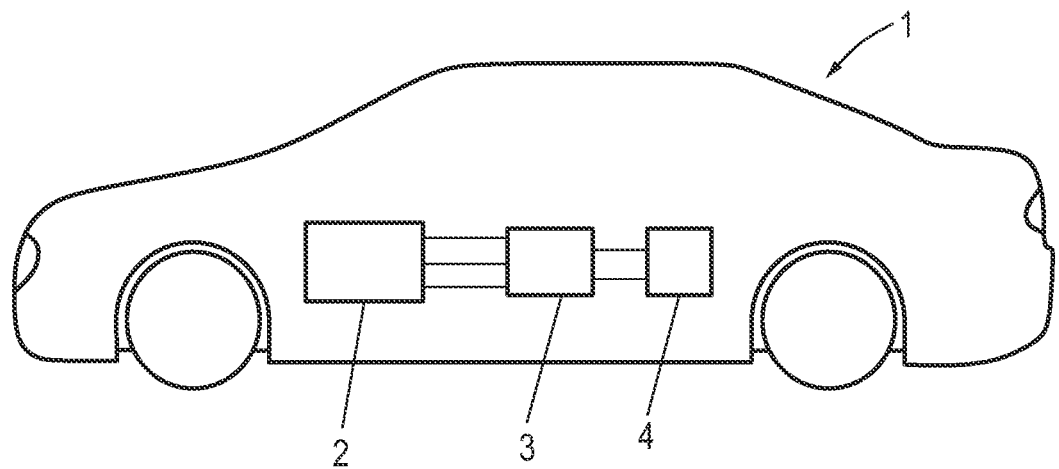
FIG. 1 is a side view of a motor vehicle according to the invention.

FIG. 1 is a side view of a motor vehicle 1. The motor vehicle 1 comprises an electric machine 2, which is designed as a traction electric motor of the motor vehicle 1. The motor vehicle 1 can be driven by the electric machine 2 in an electric driving mode. To be supplied with electrical energy, the electric machine 2 is connected to a traction energy storage 4, for example a traction battery, of the motor vehicle 1 via power electronics 3. It is possible for the motor vehicle to have more than one electric machine 2 designed as a traction electric motor, wherein the multiple electric machines 2 each can be associated with an axle and/or a wheel of the motor vehicle 1.

Figure 2:
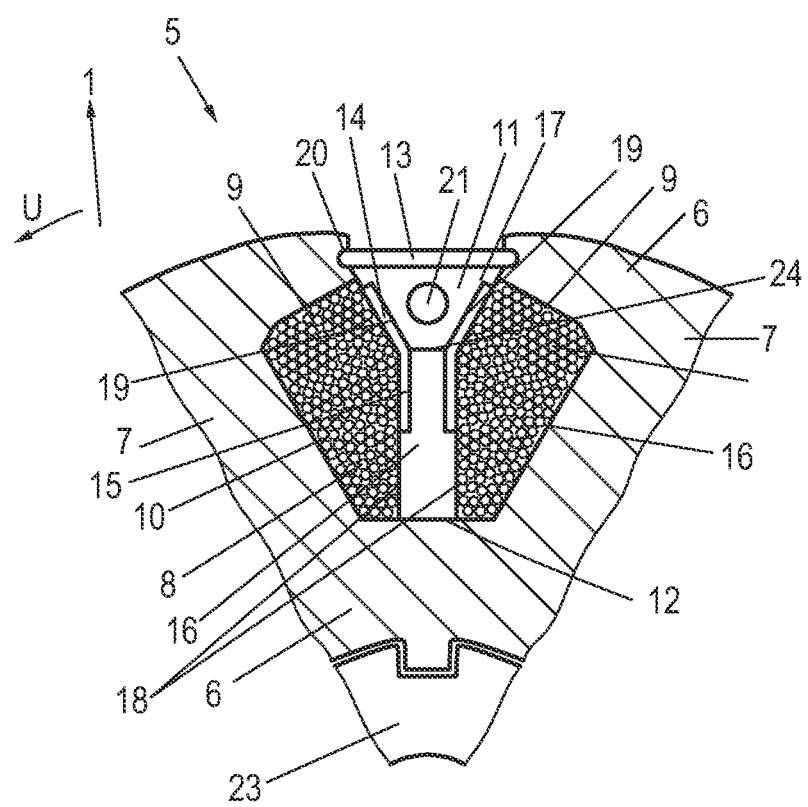
FIG. 2 is a side view of a first exemplary embodiment of an electric machine according to the invention.

FIG. 2 is a side view of a rotor 5 of an electric machine 2. For the sake of clarity, only a portion in the shape of a circular segment of the rotor 5 is shown. The entire rotor 5 is designed to be circular and comprises multiple, for example eight, circular segments which are identically designed in accordance with the portion shown and which are adjacent to one another.

The rotor 5 comprises a rotor body 6 which has multiple poles 7. Each of the poles 7 carries a rotor winding 9 which is formed from multiple conductor loops 8 and which extends on both sides of the pole 7 into a slot 10 which is adjacent to the pole 7. Furthermore, a support element 11, which adjoins the slot 10 with a radially inner end 12, is arranged in the slot 10. In a radially outer end of the slot 10, the support element 11 is in contact with a counter bearing element 13.

Respective pressure distribution elements 14 are arranged in the slot 10 between the rotor windings 9 and the support element 11. Said pressure distribution element 14 extends across a part of the radial length of the rotor winding 9 essentially up to a radially outer end of the rotor winding 9. The pressure distribution element 14 is received flush with the surface in a corresponding slot 15 of the support element 11. Additionally or alternatively, the pressure distribution element can also be accommodated in a slot in the adjacent rotor winding 9. The pressure distribution element 14 extends in the axial direction of the rotor 5, i.e., orthogonally to the plane of the drawing shown in FIG. 2, through the slot 10, such that it is arranged in particular across the entire axial extension of the adjacent rotor winding 9 between the rotor winding 9 and the support element 11 which also extends in the axial direction across the entire axial extension of the rotor winding 9.

The support element 11 comprises a first portion 16, which is positioned on the inside in the radial direction r, and a second portion 17, which is positioned on the outside in the radial direction. The radially inner portion 16 comprises two side surfaces 18 which extend parallel in the radial direction. In the second portion 17, the support element 11 has two side surfaces 19 which diverge in the radial direction, that is to say outwardly relative to the rotor 5. As a result, the second portion 17 has an essentially trapezoidal cross section in the image plane shown, which extends in the radial direction r and in the circumferential direction U. Correspondingly, the first portion 16 has an essentially I-shaped cross section in this plane.

The rotor body 6 is fastened to a rotor axle 23, such that the rotor 5 can rotate in the circumferential direction U when the electric machine 2 is in operation. When the electric machine 2 is in operation, the rotor windings 9 generate a magnetic field of the rotor, due to the rotor current flowing through the rotor windings 9. During operation of the electric machine 2, both high rotational speeds of the rotor 5 and significant heating of the rotor 6 can occur, in particular due to an ohmic loss in the current flow through the rotor windings 9. To prevent the occurrence of an imbalance due to insufficiently fixed rotor windings 9 and the occurrence of damage to the rotor windings 9 due to deformation due to centrifugal forces, a stable fit of the rotor windings 9 on the poles 7 is desirable. Fixing the rotor windings 9 in place as well as possible furthermore enables a good dissipation of the heat generated in the rotor windings 9 into the poles 7, as it can prevent the occurrence of air gaps which would interrupt a heat-conducting path between the rotor winding 9 and the rotor body 6.

For this purpose, the support element 11 is designed such that it expands when the rotor 5 rotates and/or heats up, such that it creates a pressure on the rotor windings 9. This pressure is distributed by the pressure distribution element 14 to the portion of the rotor windings 9 which is in contact with the pressure distribution element 14. This means that a deformation of the conductor loops 8 on a side of the rotor winding 9 facing the pressure distribution element 14 is avoided, in particular in a radially outer portion of the rotor, despite the centrifugal forces occurring during operation. This can prevent individual conductor loops 8 of the rotor winding 9 from shearing off one another and prevent damage to a compound matrix of the rotor winding 9, which encapsulates the conductor loops, which would negatively affect the strength of the rotor windings 9.

The pressure distribution element 14 extends across a transition area 24 between the first portion 16 and the second portion 17 essentially up to a radially outer end of the rotor winding 9. In an inner portion, in which the support element 11 is in direct contact with the rotor winding 9, the rotor winding 9 is fixed in place by the support element 11 without pressure distribution via the pressure distribution element 14.

To achieve the best possible fixing in place of the rotor winding 9, particularly in the radially outer portion, and in particular to avoid detachment of individual conductor loops 8 from the rotor winding 9, the second portion 17 of the support element 11 is designed such that it expands to a greater extent than the first portion 16 when it rotates and/or heats up. For this purpose, the second portion 17 consists of a material which has a lower strength and/or has a greater coefficient of thermal expansion than the material from which the first portion 16 is made. The first portion 16 and the second portion 17 can in particular consist of a plastic such as a thermosetting plastic and/or of a thermoplastic. Additionally, it is possible that further elements, for example fibers or the like, are introduced in the first portion and/or the second portion to adapt the mechanical and/or thermal properties of the respective materials or the respective portions.

In the radially outward direction, the support element 11 is fixed in place by the direct contact between the support element 11 and the counter bearing element 13. The counter bearing element 13 is fastened to two adjacent poles 7, wherein the counter bearing element 13 engages with the edge of a fastening slot 20. The support element 11 is in contact with a portion of the counter bearing element 13 traversing the slot 10. It is possible for the support element 11 to be connected to the counter bearing element 13 via a positive-locking connection comprising a tongue-and-groove connection. The counter bearing element 13 is designed as a wedge traversing the slot 10 in the axial direction.

The counter bearing element can at least partially consist of a metal, in particular an austenitic steel and/or of a ceramic. The pressure distribution element 14 can also consist of a metal, in particular an austenitic steel, or of a ceramic, to achieve sufficient dimensional stability when the electric machine 2 is in operation. The first portion 16 and the second portion 17 of the support element 11 can, for example, be fastened to one another by gluing or a similar method. It is also possible that the first portion 16 and the second portion 17 are not fastened to one another, wherein a stable position of the support element 11 in the slot 10 is achieved by means of fastening the support element 11 via the counter bearing element 13.

The rotor body 6 can be formed from a laminated core comprising multiple lamination sheets, wherein a tie rod is used to fasten the lamination sheets, which tie rod is arranged in a passage 21 of the support element 11. A slot insulation, for example an insulating paper and/or an insulating coating can be applied on an inner wall of the slot 10 and/or on the rotor windings 9.

Figure 3:
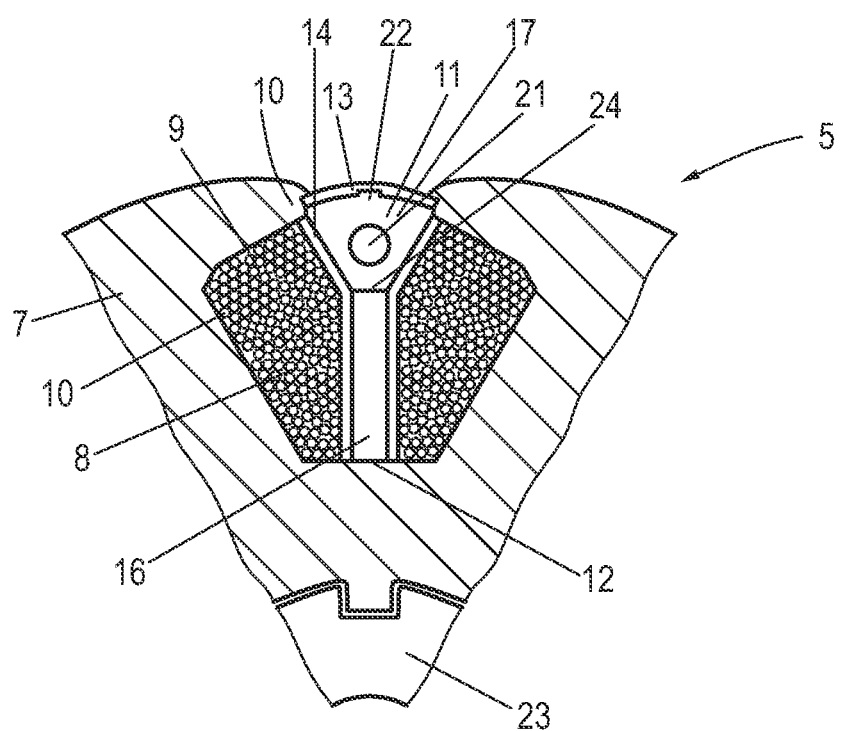
FIG. 3 is a side view of a second exemplary embodiment of an electric machine according to the invention.

FIG. 3 shows a second exemplary embodiment of a rotor 5 of an electric machine 2 according to the invention. In this embodiment, the pressure distribution elements 14 each extend across the entire radial extension of the adjacent rotor winding 9. The arrangement of the rotor windings 9, the pressure distribution element 14 and the support element 11 in the slot 10 is such that no air gap remains between these components. In this exemplary embodiment, the support element 11 is connected to the counter bearing element 13 by means of a positive-locking connection comprising at least one tongue-and-groove connection 22. Furthermore, the counter bearing element 13 has a convex curvature on its radially outer side. The remaining design of the second exemplary embodiment can in particular correspond to the first exemplary embodiment.

The invention claimed is:

1. An electric machine comprising a rotor comprising: a rotor body, wherein the rotor body has multiple poles each carrying at least one rotor winding formed from multiple conductor loops, wherein the poles extend in a radial direction of the rotor and the conductor loops pass through slots formed between two adjacent poles, wherein a support element extending in the radial direction is arranged in each of the slots between the rotor windings of the adjacent poles, wherein the support element applies pressure to the conductor loops when the rotor rotates and/or heats up, wherein a pressure distribution element extending at least in portions in the radial direction along the support element and the adjacent rotor winding is arranged between the support element and the rotor windings, which pressure distribution element distributes the pressure applied by the support element onto the adjacent rotor winding,
wherein the support element comprises a first portion and a second portion, wherein the second portion of the support element expands to a greater extent than the first portion when the rotor rotates.

2. The electric machine according to claim 1, wherein the pressure distribution element extends across the entire radial length of the rotor winding or the pressure distribution element extends over a part of the radial length of the rotor winding and is accommodated in a corresponding slot of the support element and/or the rotor winding.

3. The electric machine according to claim 2, wherein the pressure distribution element is composed at least partially of a metal, in particular an austenitic steel, or of a ceramic.

4. The electric machine according to claim 2, the support element has a first, radially inner portion and a second, radially outer portion, wherein the support element has two side surfaces extending parallel in the radial direction in the first portion and two side surfaces in the second portion which at least partially diverge in the radial direction.

5. The electric machine according to claim 1, wherein the pressure distribution element is composed at least partially of an austenitic steel, or of a ceramic.

6. The electric machine according to claim 5, the support element has a first, radially inner portion and a second, radially outer portion, wherein the support element has two side surfaces extending parallel in the radial direction in the first portion and two side surfaces in the second portion which at least partially diverge in the radial direction.

7. The electric machine according to claim 1, the support element has a first, radially inner portion and a second, radially outer portion, wherein the support element has two side surfaces extending parallel in the radial direction in the first portion and two side surfaces in the second portion which at least partially diverge in the radial direction.

8. The electric machine according to claim 7, wherein the pressure distribution element extends at least across a transition area between the first portion and the second portion of the support element between the adjacent rotor winding and the support element.

9. The electric machine according to claim 8, wherein the second portion expands to a greater extent than the first portion when it rotates and/or heats up.

10. The electric machine according to claim 8, the first portion and the second portion each are composed of a plastic, in particular of a thermosetting plastic and/or of a thermoplastic.

11. The electric machine according to claim 7, wherein the second portion expands to a greater extent than the first portion when it rotates and/or heats up.

12. The electric machine according to claim 7, the first portion and the second portion each are composed of a thermosetting plastic and/or of a thermoplastic.

13. The electric machine according to claim 1, wherein the support element is in contact with the rotor body at the radially inner end of the slot.

14. The electric machine according to claim 1, wherein the support element is in contact at a radially outer end of the slot with a counter bearing element arranged radially between the adjacent poles in a fixed manner.

15. The electric machine according to claim 14, wherein the counter bearing element is fastened to two adjacent poles, wherein a portion of the counter bearing element extending between the poles and traversing a portion of the slot is in contact, in its entirety, with the support element.

16. The electric machine according to claim 14, wherein the opposite poles each have a fastening slot, wherein the counter bearing element is fastened to the poles by engaging with the edge of the fastening slots.

17. The electric machine according to claim 14, wherein the support element and the counter bearing element engage with one another via a positive-locking connection including at least one tongue-and-groove connection.

18. The electric machine according to claim 1, wherein a slot insulation, in particular an insulating paper and/or an insulating coating, is applied on an inner wall of the slots and/or on the rotor windings.

19. The electric machine according to claim 1, wherein the rotor body is formed from a laminated core comprising multiple lamination sheets and the support element has at least one passage extending in the axial direction, wherein a tie rod is arranged in the at least one passage for fastening the lamination sheets to one another.

20. A motor vehicle comprising an electric machine according to claim 1.

* * * * *